US012574194B2

(12) United States Patent
Balasubramanian et al.

(10) Patent No.: US 12,574,194 B2
(45) Date of Patent: Mar. 10, 2026

(54) BANDWIDTH PART SWITCH WITH WAKE UP SIGNAL

(71) Applicant: QUALCOMM Incorporated, San Diego, CA (US)

(72) Inventors: Anantharaman Balasubramanian, San Diego, CA (US); Shuanshuan Wu, San Diego, CA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 17/524,694

(22) Filed: Nov. 11, 2021

(65) Prior Publication Data

US 2023/0141695 A1 May 11, 2023

(51) Int. Cl.
*H04L 5/00* (2006.01)
*H04W 52/02* (2009.01)

(52) U.S. Cl.
CPC .......... *H04L 5/0096* (2013.01); *H04L 5/0055* (2013.01); *H04L 5/006* (2013.01); *H04W 52/0216* (2013.01)

(58) Field of Classification Search
CPC ............................ H04L 5/0055; H04L 5/0087
USPC ........................................... 370/312; 455/442
See application file for complete search history.

(56) References Cited

U.S. PATENT DOCUMENTS

| | | | | |
|---|---|---|---|---|
| 2007/0255794 A1* | 11/2007 | Coutts | .................. | G06Q 10/107 |
| | | | | 709/206 |
| 2020/0037247 A1* | 1/2020 | Liao | .................. | H04W 52/0216 |
| 2020/0178144 A1* | 6/2020 | Zhou | ..................... | H04L 5/0098 |
| 2021/0028912 A1* | 1/2021 | Xu | .......................... | H04L 5/0098 |
| 2021/0051640 A1* | 2/2021 | Pao | .................. | H04W 72/0453 |
| 2021/0084586 A1* | 3/2021 | Loehr | .................. | H04W 76/28 |
| 2021/0127383 A1* | 4/2021 | Hui | ....................... | H04L 1/1812 |
| 2021/0227604 A1* | 7/2021 | Huang | ................ | H04W 40/248 |
| 2021/0259044 A1* | 8/2021 | Islam | ................ | H04W 72/535 |
| 2022/0029768 A1* | 1/2022 | Herath | .................. | H04L 1/1671 |
| 2022/0095232 A1* | 3/2022 | Li | ....................... | H04W 52/0235 |
| 2022/0159574 A1* | 5/2022 | Islam | ................ | H04W 52/0219 |
| 2022/0225280 A1* | 7/2022 | Yang | ...................... | H04W 72/02 |
| 2022/0353815 A1* | 11/2022 | Lin | ................... | H04W 52/0232 |
| 2023/0163915 A1* | 5/2023 | Shibaike | ............. | H04J 13/0062 |
| | | | | 370/329 |
| 2023/0224813 A1* | 7/2023 | Mohammad Soleymani | .............. | |
| | | | | H04W 52/0216 |
| | | | | 370/311 |
| 2024/0172235 A1* | 5/2024 | Pan | ........................ | H04W 72/02 |
| 2024/0196469 A1* | 6/2024 | Oteri | ..................... | H04W 76/27 |

* cited by examiner

*Primary Examiner* — Charles N Appiah
*Assistant Examiner* — Frank E Donado
(74) *Attorney, Agent, or Firm* — Harrity & Harrity, LLP

(57) ABSTRACT

Various aspects of the present disclosure generally relate to wireless communication. In some aspects, a first mobile station may select a sequence that is to be used by a second mobile station to wake up and switch to a bandwidth part indicated by the sequence. The first mobile station may transmit the sequence to the second mobile station. Numerous other aspects are described.

18 Claims, 11 Drawing Sheets

Select, by the first mobile station, a sequence that is to be used by a second mobile station to wake up and switch to a bandwidth part (BWP) indicated by the sequence

810

Transmit the sequence to the second mobile station

820

800

900

910

Receive, from a first mobile station, a sequence that is to be used by the second mobile station to wake up and switch to a BWP indicated by the sequence

920

Switch to the BWP after waking up in connection with receiving the sequence

BANDWIDTH PART SWITCH WITH WAKE UP SIGNAL

FIELD OF THE DISCLOSURE

Aspects of the present disclosure generally relate to wireless communication and to techniques and apparatuses for an integrated wake up signal and bandwidth part switch sequence.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first mobile station. The method may include selecting, by the first mobile station, a sequence that is to be used by a second mobile station to wake up and switch to a bandwidth part (BWP)

indicated by the sequence. The method may include transmitting, by the first mobile station, the sequence to the second mobile station.

Some aspects described herein relate to a method of wireless communication performed by a second mobile station. The method may include receiving, by the second mobile station from a first mobile station, a sequence that is to be used by the second mobile station to wake up and switch to a BWP indicated by the sequence. The method may include switching, by the second mobile station, to the BWP after waking up in connection with receiving the sequence.

Some aspects described herein relate to a first mobile station for wireless communication. The first mobile station may include a memory and one or more processors coupled to the memory. The one or more processors may be configured to, based at least in part on information stored in the memory, select a sequence that is to be used by a second mobile station to wake up and switch to a BWP indicated by the sequence. The one or more processors may be configured to transmit the sequence to the second mobile station.

Some aspects described herein relate to a second mobile station for wireless communication. The second mobile station may include a memory and one or more processors coupled to the memory. The one or more processors may be configured to, based at least in part on information stored in the memory, receive a sequence that is to be used by the second mobile station to wake up and switch to a BWP indicated by the sequence. The one or more processors may be configured to switch to the BWP after waking up in connection with receiving the sequence.

Some aspects described herein relate to a non-transitory computer-readable medium that stores a set of instructions for wireless communication by a first mobile station. The set of instructions, when executed by one or more processors of the first mobile station, may cause the first mobile station to select a sequence that is to be used by a second mobile station to wake up and switch to a BWP indicated by the sequence. The set of instructions, when executed by one or more processors of the first mobile station, may cause the first mobile station to transmit the sequence to the second mobile station.

Some aspects described herein relate to a non-transitory computer-readable medium that stores a set of instructions for wireless communication by a second mobile station. The set of instructions, when executed by one or more processors of the second mobile station, may cause the second mobile station to receive a sequence that is to be used by the second mobile station to wake up and switch to a BWP indicated by the sequence. The set of instructions, when executed by one or more processors of the second mobile station, may cause the second mobile station to switch to the BWP after waking up in connection with receiving the sequence.

Some aspects described herein relate to an apparatus for wireless communication. The apparatus may include means for selecting a sequence that is to be used by another apparatus to wake up and switch to a BWP indicated by the sequence. The apparatus may include means for transmitting the sequence to the other apparatus.

Some aspects described herein relate to an apparatus for wireless communication. The apparatus may include means for receiving a sequence that is to be used by the apparatus to wake up and switch to a BWP indicated by the sequence. The apparatus may include means for switching to the BWP after waking up in connection with receiving the sequence.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
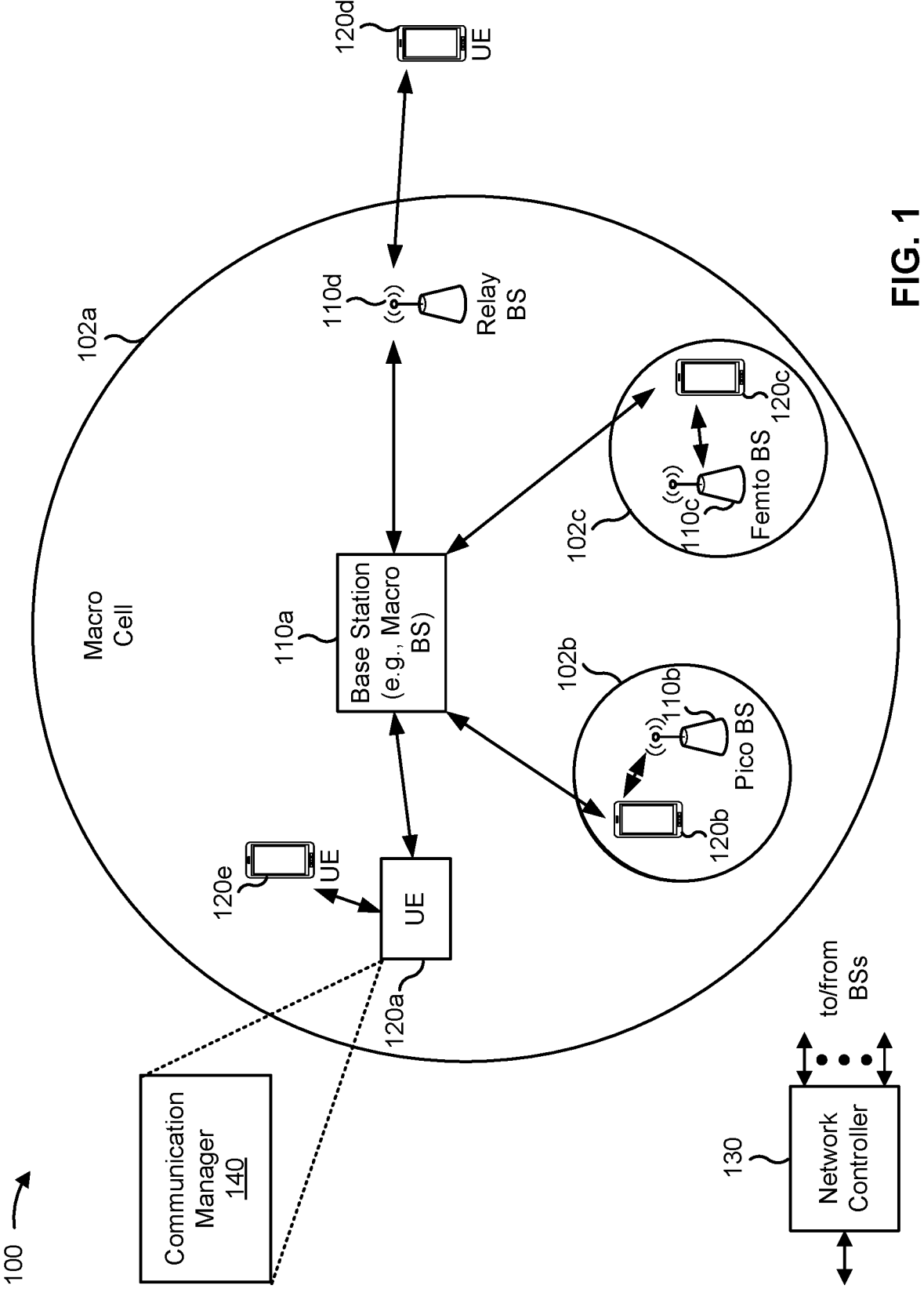
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A UE may also be referred to a "mobile station". A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), a roadside unit (RSU), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, RSUs, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a first mobile station (e.g., UE 120) may include a communication manager 140. As described in more detail elsewhere herein, the communication manager 140 may select a sequence that is to be used by a second mobile station to wake up and switch to a bandwidth part (BWP) indicated by the sequence and transmit the sequence to the second mobile station. Additionally, or alternatively, the communication manager 140 may perform one or more other operations described herein.

In some aspects, a second mobile station (e.g., UE 120) may include a communication manager 140. As described in more detail elsewhere herein, the communication manager 140 may receive a sequence that is to be used by the second mobile station to wake up and switch to a BWP indicated by the sequence. The communication manager 140 may switch to the BWP after waking up in connection with receiving the sequence. Additionally, or alternatively, the communication manager 140 may perform one or more other operations described herein.

As indicated above, FIG. 1 is provided as an example. Other examples may differ from what is described with regard to FIG. 1.

Figure 2:
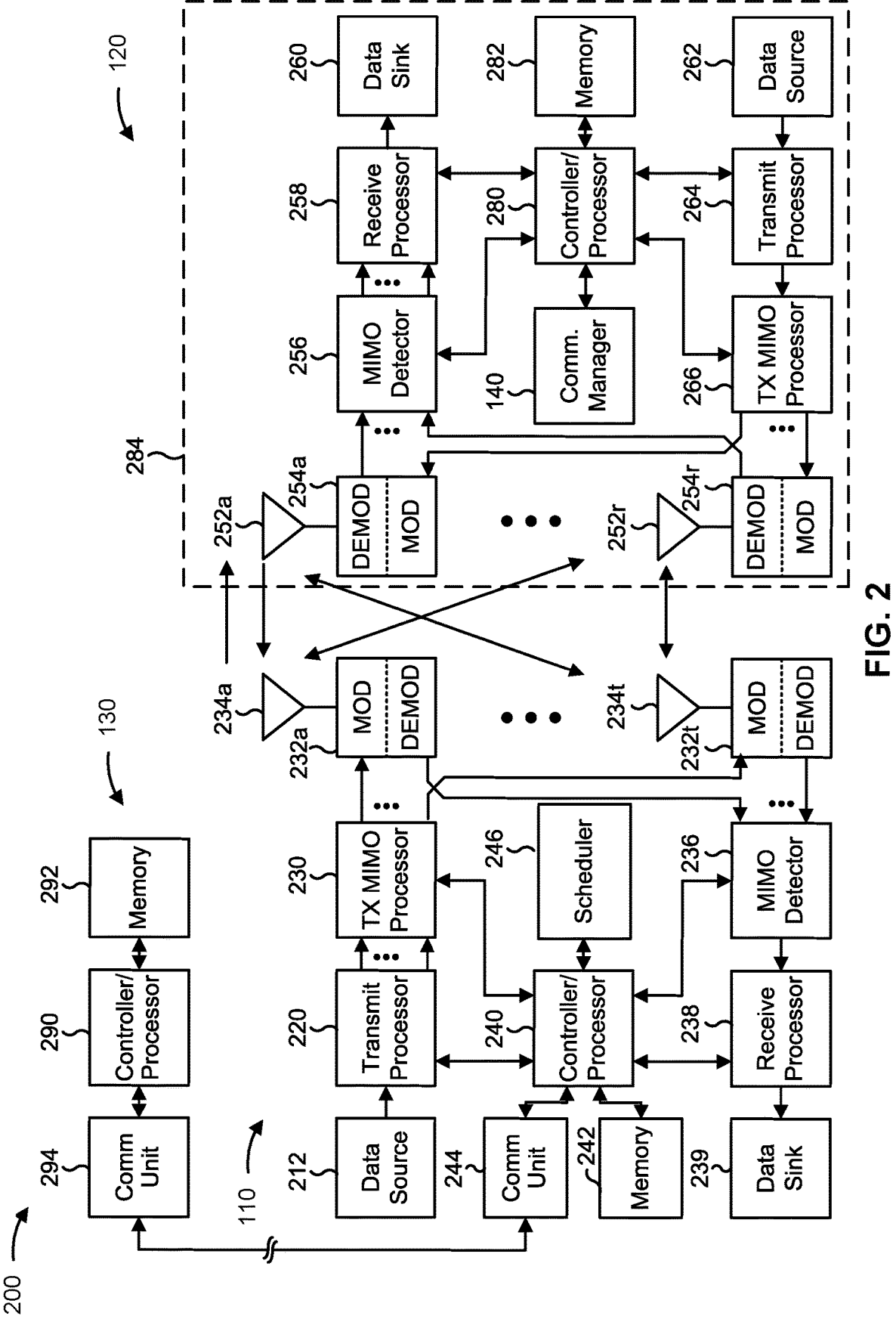
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with using an integrated wake up signal (WUS) and BWP switching sequence, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a first mobile station (e.g., UE 120) includes means for selecting, by the first mobile station, a sequence that is to be used by a second mobile station to wake up and switch to a BWP indicated by the sequence, and/or means for transmitting, by the first mobile station, the sequence to the second mobile station. In some aspects, the means for the first mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a second mobile station (e.g., UE 120) includes means for receiving, by the second mobile station from a first mobile station, a sequence that is to be used by the second mobile station to wake up and switch to a BWP indicated by the sequence, and/or means for switching, by the second mobile station, to the BWP after waking up in connection with receiving the sequence. In some aspects, the means for the second mobile station to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
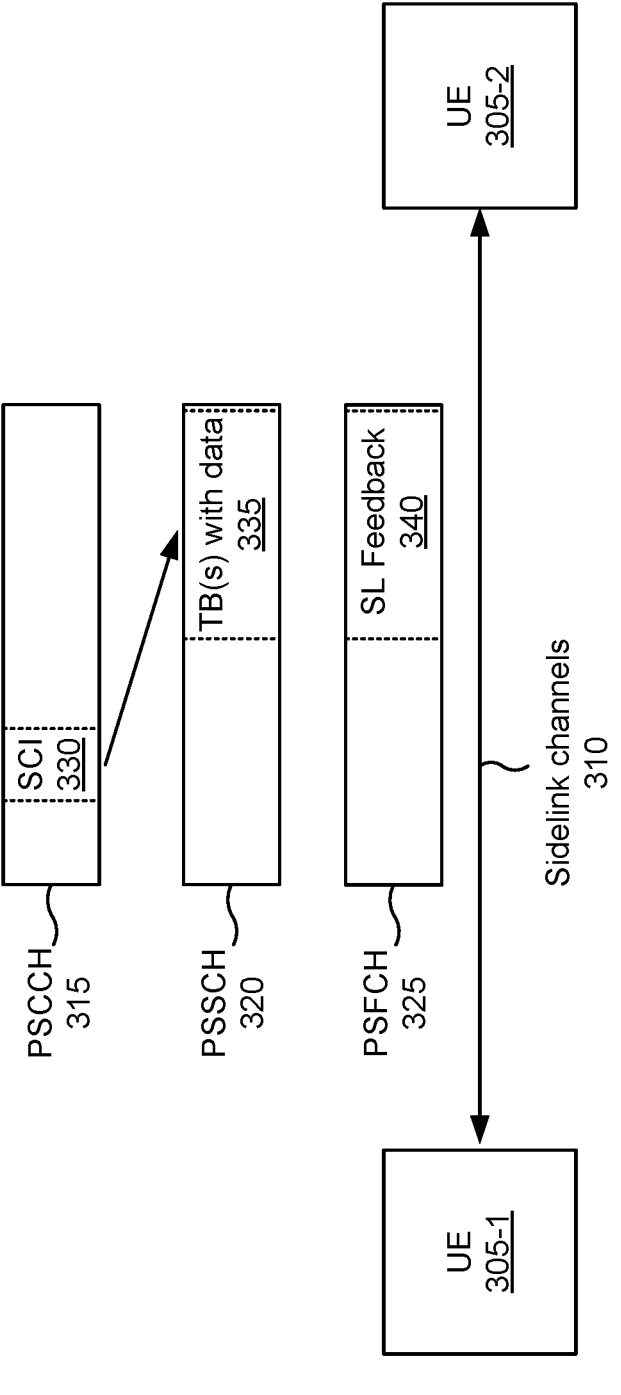
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QOS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process identifier (ID), a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a sidelink transmission mode (e.g., Mode 1) where resource selection and/or scheduling is performed by a base station 110. For example, the UE 305 may receive a grant (e.g., in downlink control information (DCI) or in a radio resource control (RRC) message, such as for configured grants) from the base station 110 for sidelink channel access and/or scheduling. In some aspects, a UE 305 may operate using a transmission mode (e.g., Mode 2) where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
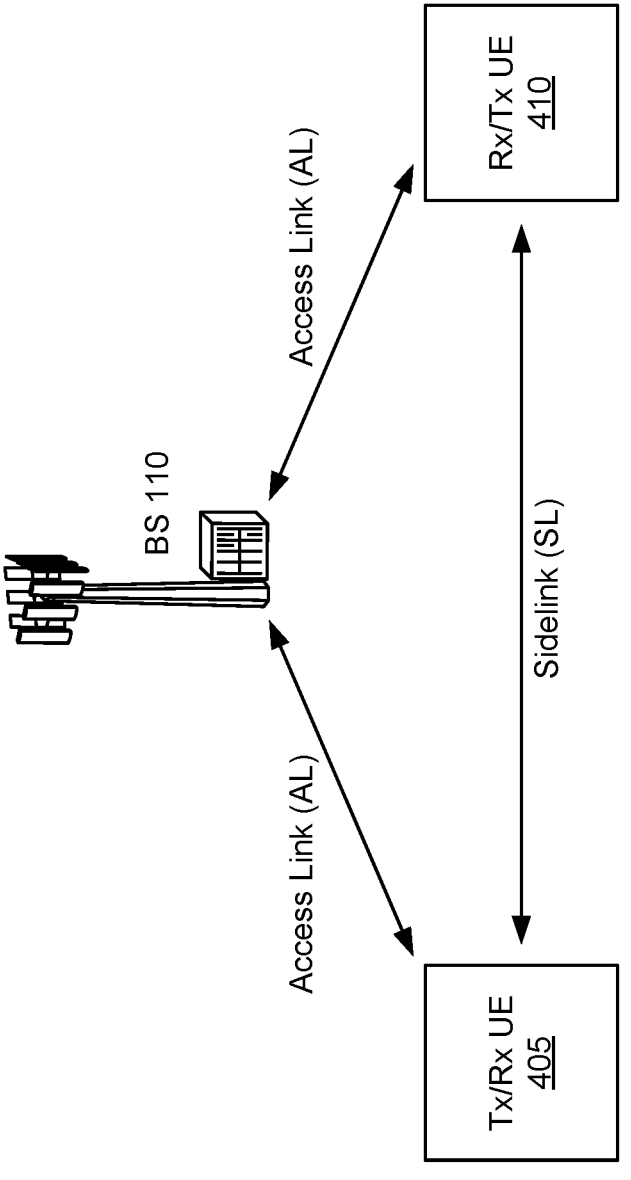
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
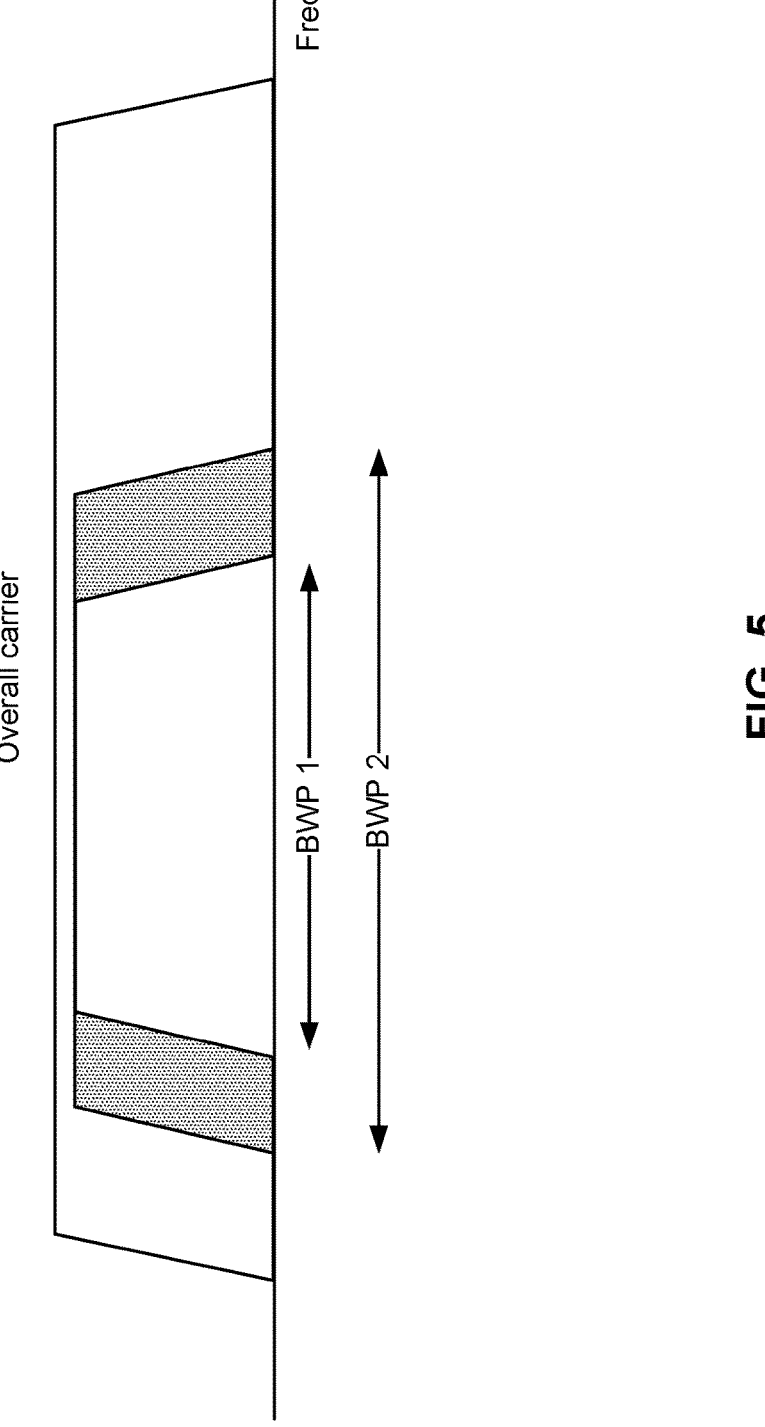
FIG. 5 is a diagram illustrating an example of bandwidth parts (BWPs), in accordance with the present disclosure.

FIG. 5 is a diagram illustrating an example 500 of BWPs, in accordance with the present disclosure.

A UE may switch to a BWP that is only part of a frequency band. The UE may save power by using part of the frequency band rather than the whole band. The UE may switch to different BWPs to account for data variations. For example, BWP 2 in example 500 may be used instead of the overall frequency for the carrier. However, if there is less data to be communicated, the UE may switch to BWP 1. The UE may use BWP 1 or BWP 2 as a default BWP for receiving synchronization signal blocks (SSBs).

After an initial access by the UE, a base station (e.g., gNB) may cause the UE to switch from the default BWP to another BWP via radio resource control (RRC) switching or via downlink control information (DCI). However, using DCI to switch BWPs may be problematic if the UE fails to decode the DCI. This may make communications difficult thereafter.

There are options for BWP support. In one option, a BWP may be configured based on cell-specific parameters and/or UE-specific parameters. UE-specific parameters for BWP configuration may take into account a BWP switching capability of the UE and thus the gNB may be aware of the type of BWP switch that a UE can support before BWP switching is performed. BWP switching may be used in sidelink communications between a first UE and a second UE.

The first UE may enter an idle state to save power and wake up and enter a connected state periodically or when woken up with a WUS. For example, a second UE may wake up the first UE to transmit a low data rate application (e.g., impending collision indication) or a high data rate application (e.g., sensor sharing application). That is, the first UE may need to be woken up with a WUS signal, but the WUS signal does not indicate whether the first UE is to switch to a low data BWP or a high data BWP. To cause the first UE to switch to the appropriate BWP, the second UE has to transmit additional RRC signaling, which consumes time and signaling resources.

According to various aspects described herein, the second UE may transmit a message that both wakes up the first UE and switches the first UE to a BWP. The message may be a sequence, such as an integrated WUS and BWP sequence. The sequence may indicate the BWP to which the first UE is to switch. The indicated BWP may be the BWP that is active when the first UE wakes up. Switching to the BWP may include the first UE waking up to a different BWP than the default BWP or waking up to the default BWP if the indicated BWP is also the default BWP. The sequence may be used for unicast or groupcast communications and for connectionless or connected UEs. As a result, the first UE may save time and conserve signaling resources.

As indicated above, FIG. 5 is provided as an example. Other examples may differ from what is described with regard to FIG. 5.

Figure 6:
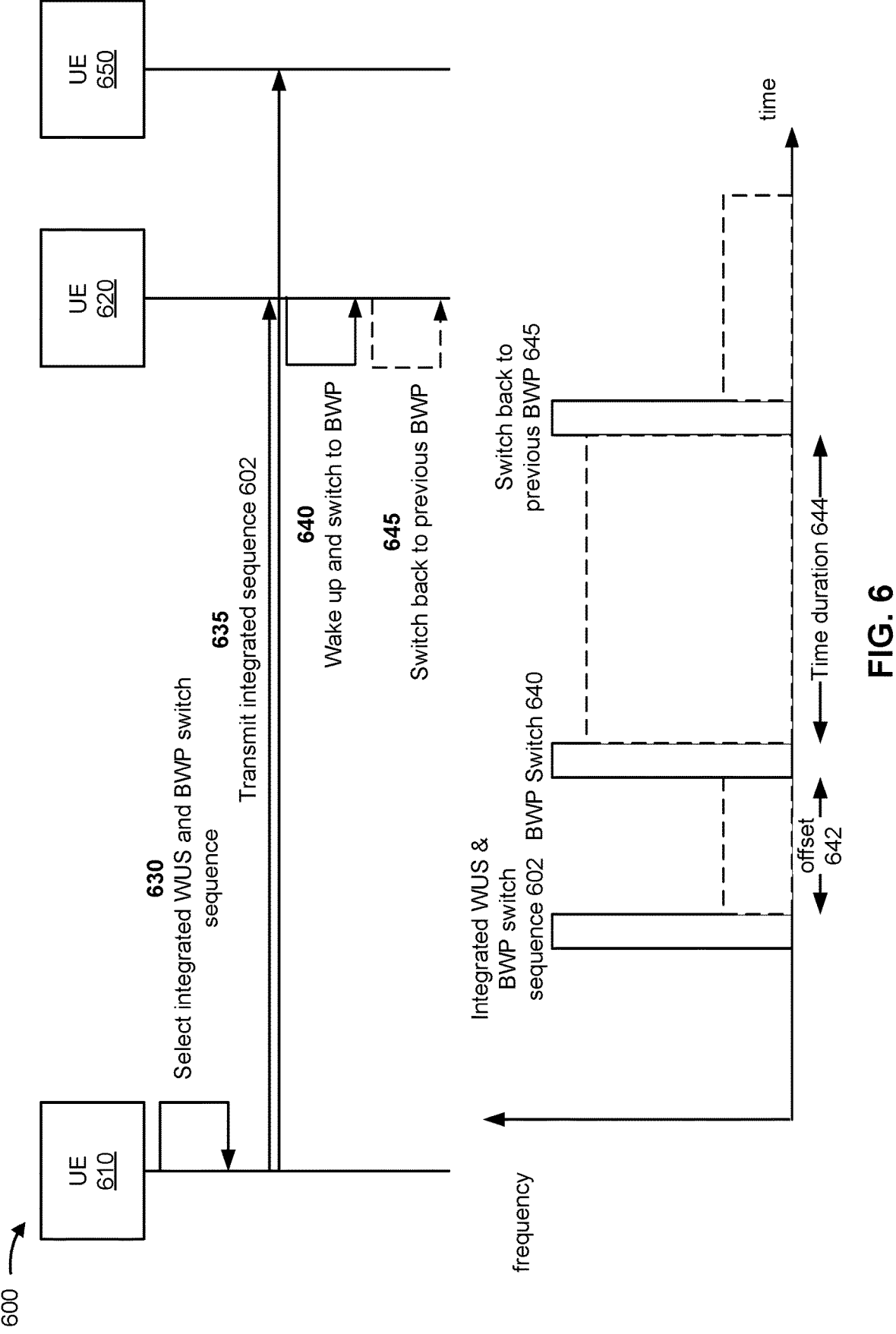
FIG. 6 is a diagram illustrating an example associated with using an integrated wake up signal and BWP switch sequence, in accordance with the present disclosure.

FIG. 6 is a diagram illustrating an example 600 associated with using an integrated WUS and BWP switch sequence 602, in accordance with the present disclosure. As shown in FIG. 6, a first UE 610 (e.g., a UE 120, UE 405) and a second UE 620 (e.g., a UE 120, UE 410) may communicate with one another. UE 620 may be in an idle state.

As shown by reference number 630, UE 610 may select the integrated sequence 602, which is a sequence (coded indication) that integrates a WUS and a BWP switch into a single message. UE 610 may select the BWP based at least in part on an application used by UE 620, traffic conditions, UE type, UE status, or sidelink channel conditions. UE 610 may select the integrated sequence 602 associated with the selected BWP from among multiple sequences for multiple BWPs. UE 610 may also select the integrated sequence 602 by generating the integrated sequence 602 for the selected BWP and to include the WUS. As shown by reference number 635, UE 610 may transmit the integrated sequence 602 to UE 620.

As shown by reference number 640, UE 620 may wake up after receiving the integrated sequence 602 and switch to the BWP indicated by the integrated sequence 602. In some aspects, the indicated BWP may be activated before or when UE 620 wakes up. Alternatively, UE 620 may switch to the indicated BWP after waking up. This may include waiting for a delay. For example, for unicast sidelink communications, UE 610 may transmit the integrated sequence 602 to UE 620 based at least in part on a unique sequence or resource. The integrated sequence 602 may be a preconfigured first wake up sequence that indicates that UE 620 is to wake up and switch to BWP 1 from its currently used BWP 0 after a T slot delay (e.g., offset 642 in example 600). The integrated sequence 602 may be a preconfigured second wake up sequence that indicates that UE 620 is to wake up and switch to BWP 2 from current BWP 0 after a $T_1$ slot delay. The integrated sequence 602 may be a first wake up sequence at a preconfigured first resource (e.g., symbol or physical resource block) that indicates that UE 620 is to wake up and switch to BWP 3 from its current BWP 0 after a $T_1$ slot delay.

In some aspects, the integrated sequence 602 may indicate that UE 620 is to wake up and perform the BWP switch only for a time duration 644 of $T_3$ slots from the offset 642 of $T_1$ slots (slot offset or offset time period with respect to the slot when the integrated sequence 602 is received), and thereafter switch back to the previous BWP (e.g., default BWP), as shown by reference number 645. The offset 642 from which the BWP is active and the time duration 644 of the BWP switch may be based at least in part on the sequence or resource in which the integrated sequence 602 is transmitted. For example, as shown in example 600, the integrated sequence 602 may indicate BWP 1, the offset 642 after reception of the integrated sequence 602 to switch to BWP 1 (activate BWP 1), and the time duration 644 during which BWP 1 is active before UE 620 switches back to the previous BWP. UE 620 may use a timer for the time duration 644 (switch duration). UE 610 switches BWPs as well, to operate in the same BWP as UE 620.

In some aspects, UE 620 may provide feedback to UE 610 on an assigned feedback resource. UE 620 may provide successful feedback when UE 620 wakes up. If UE 610 does not receive successful feedback (or receives negative feedback), such as during the offset 642, UE 610 may not switch to the BWP indicated by the integrated sequence 602. UE 610 may transmit a message to UE 620, informing UE 620 that there is to be no BWP switch, and UE 610 and UE 620 may continue operating in a current BWP (e.g., default BWP).

In an example for groupcast sidelink communications, UE 610 may select the integrated sequence 602 from among a set of group integrated sequences. UE 610 may transmit the integrated sequence 602 to a group of UEs, which may include UE 620 and UE 650. UE 620 may wake up and determine that the integrated sequence 602 is group-specific and not UE-specific. The integrated sequence 602 may include a group identifier (ID) or a destination ID that is common to UE 620 and UE 650.

In some aspects, if any UE in the group of UEs is not able to accommodate a requested BWP switch, that UE may transmit negative feedback (e.g., NACK) to UE 610. UE 610 may then transmit a message to the group that cancels the BWP switch (fall back to current or default BWP). In this scenario, the integrated sequence 602 may act as a WUS but not an indication of a BWP switch. UE 610 (or a gNB or an RSU) may be aware of BWP switch capabilities of UE 620 and UE 650, and may provide a group integrated sequence that ensures that all UEs in the group, such as UE 620 and UE 650, have the appropriate BWP switch capability.

As indicated above, FIG. 6 is provided as an example. Other examples may differ from what is described with regard to FIG. 6.

Figure 7:
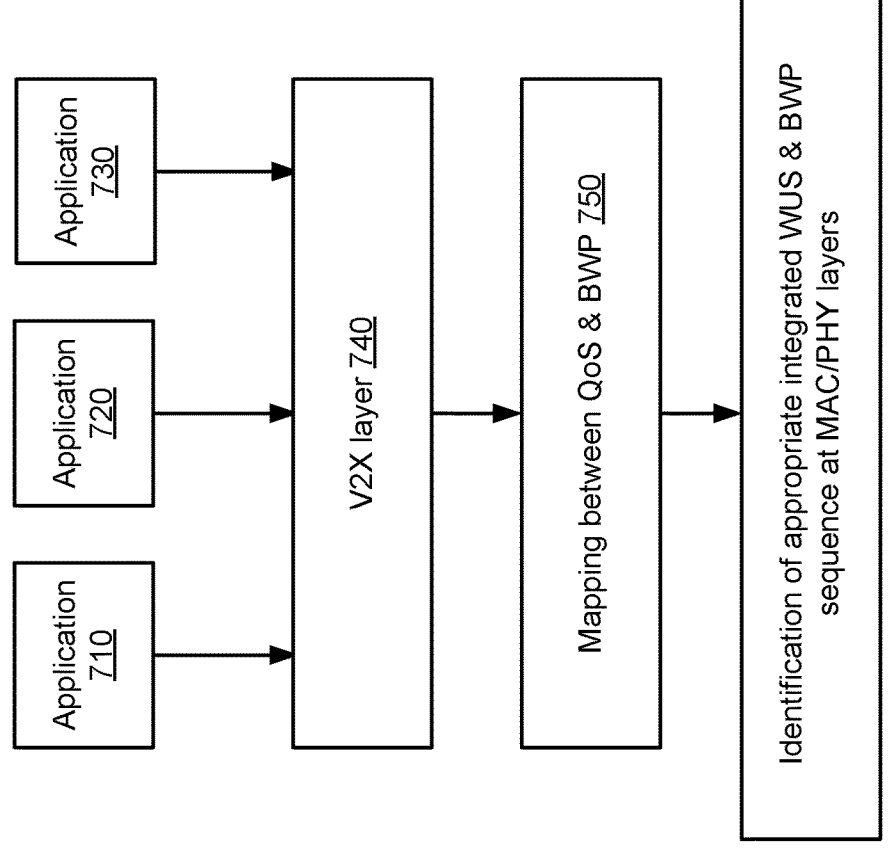
FIG. 7 is a diagram illustrating an example of an application associated with an integrated sequence, in accordance with the present disclosure.

FIG. 7 is a diagram illustrating an example 700 of an application associated with an integrated sequence, in accordance with the present disclosure. Example 700 shows applications 710, 720, and 730.

In some aspects, BWPs may be mapped to applications of the UE 620 and/or to Quality of Services (QoSs) of the applications. For example, a V2X layer 740 (e.g., in UE 610 or an RSU) may determine an application ID of a message to be transmitted and a possible receiver (e.g., UE 620) of the message. This determination may be a trigger for the integrated sequence 602. If the receiver is determined to be in an idle state (e.g., via information obtained from a prior discontinuous reception (DRX) cycle exchange) and needs to be woken up, then the V2X layer 740 may determine a QoS requirement (e.g., bandwidth requirement) for transmitting the application, together with the required wake-up configuration (e.g., group-specific or UE-specific) for the integrated sequence 602. The V2X layer 740 may use a mapping 750 between the QoS requirement (e.g., bandwidth requirement) and the appropriate BWP to identify the BWP for the integrated sequence 602. The V2X layer 740 may indicate the appropriate BWP to the medium access control (MAC) and physical (PHY) layers for selection of the corresponding integrated sequence 602. The integrated sequence 602 may be transmitted to wake up the receiver in the appropriate BWP, to satisfy the QoS requirement for the application with reduced latency.

As indicated above, FIG. 7 is provided as an example. Other examples may differ from what is described with regard to FIG. 7.

Figure 8:
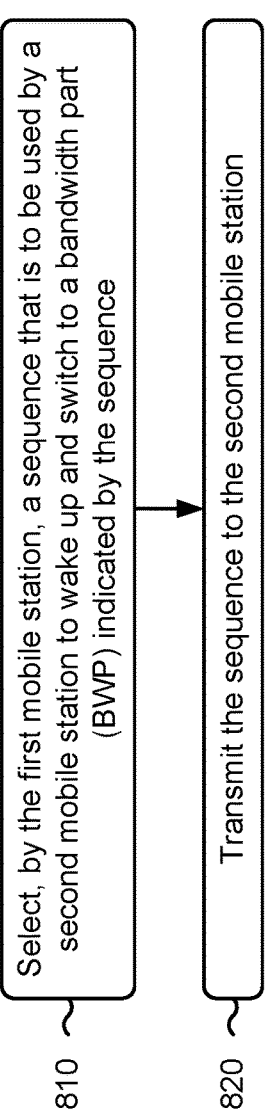
FIG. 8 is a diagram illustrating an example process performed, for example, by a first mobile station, in accordance with the present disclosure.

FIG. 8 is a diagram illustrating an example process 800 performed, for example, by a first mobile station, in accordance with the present disclosure. Example process 800 is an example where the first mobile station (e.g., a UE 120, UE 610) performs operations associated with an integrated WUS and BWP switch sequence.

As shown in FIG. 8, in some aspects, process 800 may include selecting a sequence that is to be used by a second mobile station to wake up and switch to a BWP indicated by the sequence (block 810). For example, the first mobile station (e.g., using communication manager 140 and/or selection component 1008 depicted in FIG. 10) may select a sequence that is to be used by a second mobile station to wake up and switch to a BWP indicated by the sequence, as described above.

As further shown in FIG. 8, in some aspects, process 800 may include transmitting the sequence to the second mobile station (block 820). For example, the first mobile station (e.g., using communication manager 140 and/or transmission component 1004 depicted in FIG. 10) may transmit the sequence to the second mobile station, as described above.

Process 800 may include additional aspects, such as any single aspect or any combination of aspects described below and/or in connection with one or more other processes described elsewhere herein.

In a first aspect, the sequence indicates that the BWP is a first BWP and that the second mobile station is to wake up and switch to the first BWP after an offset.

In a second aspect, alone or in combination with the first aspect, the sequence indicates that the second mobile station is to wake up at a first resource.

In a third aspect, alone or in combination with one or more of the first and second aspects, the sequence indicates that the second mobile station is to switch to the BWP for a time duration and return to a previous BWP after the time duration.

In a fourth aspect, alone or in combination with one or more of the first through third aspects, the sequence indicates an offset from which the time duration starts.

In a fifth aspect, alone or in combination with one or more of the first through fourth aspects, process 800 includes switching, by the first mobile station, to the BWP associated with the sequence.

In a sixth aspect, alone or in combination with one or more of the first through fifth aspects, process 800 includes continuing, by the first mobile station, in a current BWP if feedback for the sequence is not received within an offset period after transmitting the sequence.

In a seventh aspect, alone or in combination with one or more of the first through sixth aspects, selecting the sequence includes selecting the sequence from within a set of group integrated sequences, and transmitting the sequence includes transmitting the sequence to a group of mobile stations that includes the second mobile station.

In an eighth aspect, alone or in combination with one or more of the first through seventh aspects, process 800 includes transmitting, by the first mobile station to the group of mobile stations, a message to cancel switching to the BWP if a NACK is received from at least one mobile station of the group of mobile stations.

In a ninth aspect, alone or in combination with one or more of the first through eighth aspects, transmitting the sequence to the group of mobile stations includes transmitting the sequence to the group of mobile stations based at least in part on information that indicates that each of the mobile stations in the group of mobile stations has a capability to switch to the BWP.

In a tenth aspect, alone or in combination with one or more of the first through ninth aspects, selecting the sequence includes selecting the sequence based at least in part on a trigger from an application.

In an eleventh aspect, alone or in combination with one or more of the first through tenth aspects, the BWP is mapped to the application.

In a twelfth aspect, alone or in combination with one or more of the first through eleventh aspects, the BWP is mapped to a QoS for the application.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
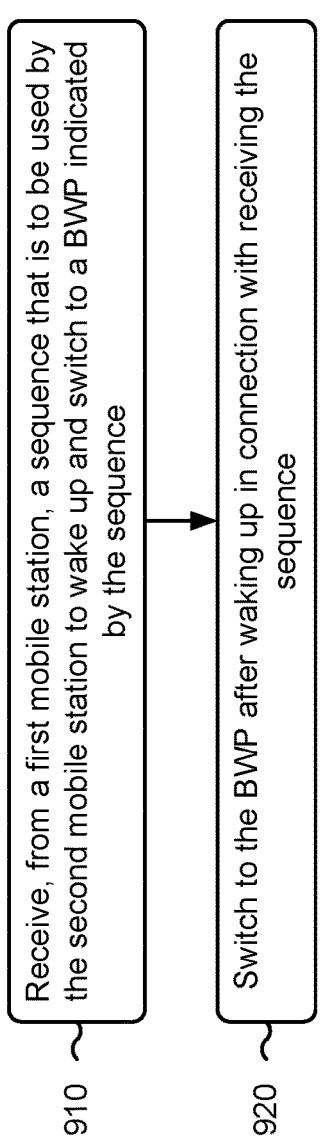
FIG. 9 is a diagram illustrating an example process performed, for example, by a second mobile station, in accordance with the present disclosure.

FIG. 9 is a diagram illustrating an example process 900 performed, for example, by a second mobile station, in accordance with the present disclosure. Example process 900 is an example where the second mobile station (e.g., a UE 120, UE 620) performs operations associated with an integrated WUS and BWP switch sequence.

As shown in FIG. 9, in some aspects, process 900 may include receiving a sequence that is to be used by the second mobile station to wake up and switch to a BWP indicated by the sequence (block 910). For example, the second mobile station (e.g., using communication manager 140 and/or reception component 1102 depicted in FIG. 11) may receive a sequence that is to be used by the second mobile station to wake up and switch to a BWP indicated by the sequence, as described above.

As further shown in FIG. 9, in some aspects, process 900 may include switching to the BWP after waking up in connection with receiving the sequence (block 920). For example, the second mobile station (e.g., using communication manager 140 and/or switching component 1108 depicted in FIG. 11) may switch to the BWP after waking up in connection with receiving the sequence, as described above.

Process 900 may include additional aspects, such as any single aspect or any combination of aspects described below and/or in connection with one or more other processes described elsewhere herein.

In a first aspect, the sequence indicates that the BWP is a first BWP and that the second mobile station is to wake up and switch to the first BWP after an offset.

In a second aspect, alone or in combination with the first aspect, the sequence indicates that the second mobile station is to wake up at a first resource, and the waking up includes waking up at the first resource.

In a third aspect, alone or in combination with one or more of the first and second aspects, the sequence indicates that the second mobile station is to switch to the BWP for a time duration and return to a previous BWP after the time duration, and process 900 includes switching to the previous BWP after the time duration.

In a fourth aspect, alone or in combination with one or more of the first through third aspects, the sequence indicates an offset from which the time duration starts, and process 900 includes starting the time duration based at least in part on the offset.

In a fifth aspect, alone or in combination with one or more of the first through fourth aspects, process 900 includes transmitting, by the second mobile station to the first mobile station, feedback for the sequence.

In a sixth aspect, alone or in combination with one or more of the first through fifth aspects, process 900 includes receiving a message to cancel the switching to the BWP, and canceling the switching to the BWP.

In a seventh aspect, alone or in combination with one or more of the first through sixth aspects, the BWP is mapped to an application.

In an eighth aspect, alone or in combination with one or more of the first through seventh aspects, the BWP is mapped to a QoS for an application.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
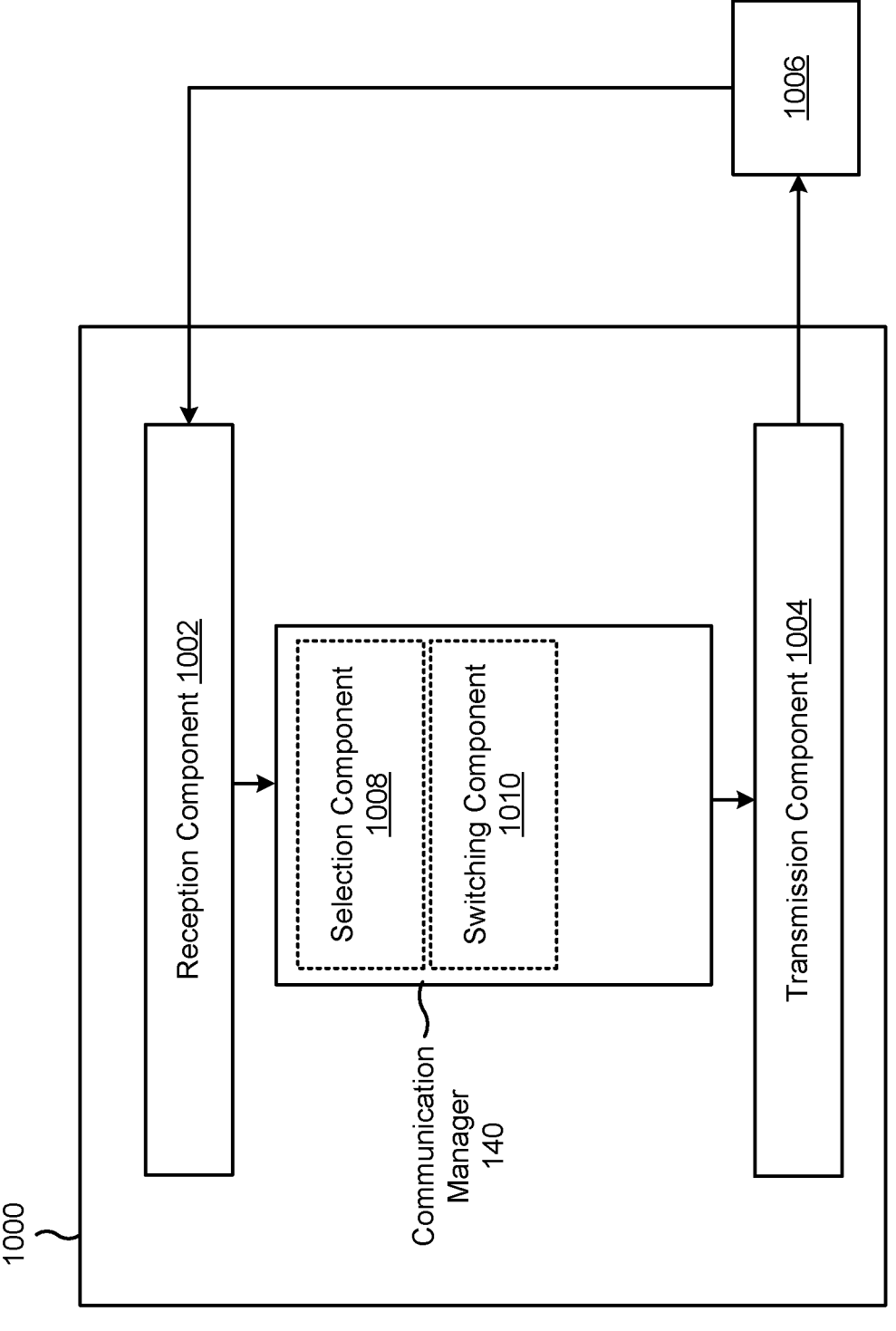
FIGS. 10-11 are diagrams of example apparatuses for wireless communication, in accordance with the present disclosure.

FIG. 10 is a diagram of an example apparatus 1000 for wireless communication. The apparatus 1000 may be a first mobile station (e.g., a UE 120, UE 610), or a first mobile station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a selection component 1008 and/or a switching component 1010, among other examples.

In some aspects, the apparatus 1000 may be configured to perform one or more operations described herein in connection with FIGS. 1-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the first mobile station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the first mobile station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/ processor, a memory, or a combination thereof, of the first mobile station described in connection with FIG. 2. In some aspects, the transmission component 1004 may be co-located with the reception component 1002 in a transceiver.

The selection component 1008 may select a sequence that is to be used by a second mobile station to wake up and switch to a BWP indicated by the sequence. The transmission component 1004 may transmit the sequence to the second mobile station.

The switching component 1010 may switch to the BWP associated with the sequence. The switching component 1010 may continue in a current BWP if feedback for the sequence is not received within an offset period after transmitting the sequence. The transmission component 1004 may transmit a message to cancel switching to the BWP if a NACK is received from at least one mobile station of the group of mobile stations.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
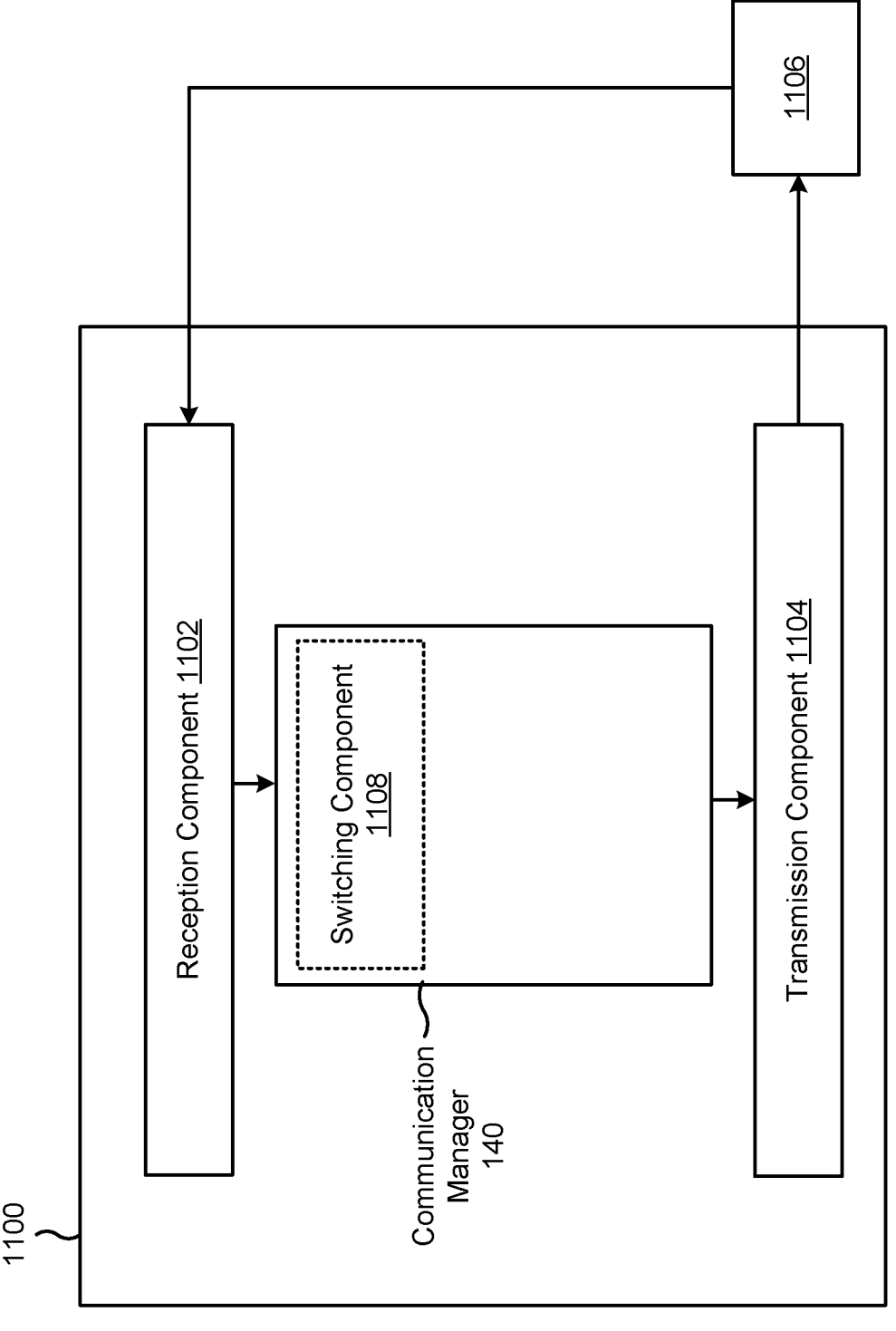

FIG. 11 is a diagram of an example apparatus 1100 for wireless communication. The apparatus 1100 may be a second mobile station (e.g., a UE 120, UE 620), or a second mobile station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a switching component 1108, among other examples.

In some aspects, the apparatus 1100 may be configured to perform one or more operations described herein in connection with FIGS. 1-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the second mobile station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the second mobile station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the second mobile station described in connection with FIG. 2. In some aspects, the transmission component 1104 may be co-located with the reception component 1102 in a transceiver.

The reception component 1102 may receive a sequence that is to be used by the second mobile station to wake up and switch to a BWP indicated by the sequence. The switching component 1108 may switch to the BWP after waking up in connection with receiving the sequence. The transmission component 1104 may transmit feedback for the sequence. The reception component 1102 may receive a message to cancel the switching to the BWP. The switching component 1108 may cancel the switching to the BWP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a first mobile station, comprising: selecting, by the first mobile station, a sequence that is to be used by a second mobile station to wake up and switch to a bandwidth part (BWP) indicated by the sequence; and transmitting, by the first mobile station, the sequence to the second mobile station.

Aspect 2: The method of Aspect 1, wherein the sequence indicates that the BWP is a first BWP and that the second mobile station is to wake up and switch to the first BWP after an offset.

Aspect 3: The method of Aspect 1 or 2, wherein the sequence indicates that the second mobile station is to wake up at a first resource.

Aspect 4: The method of any of Aspects 1-3, wherein the sequence indicates that the second mobile station is to switch to the BWP for a time duration and return to a previous BWP after the time duration.

Aspect 5: The method of Aspect 4, wherein the sequence indicates an offset from which the time duration starts.

Aspect 6: The method of any of Aspects 1-5, further comprising switching, by the first mobile station, to the BWP associated with the sequence.

Aspect 7: The method of any of Aspects 1-5, further comprising continuing, by the first mobile station, in a current BWP if feedback for the sequence is not received within an offset period after transmitting the sequence.

Aspect 8: The method of any of Aspects 1-7, wherein selecting the sequence includes selecting the sequence from within a set of group integrated sequences, and wherein transmitting the sequence includes transmitting the sequence to a group of mobile stations that includes the second mobile station.

Aspect 9: The method of Aspect 8, further comprising transmitting, by the first mobile station to the group of mobile stations, a message to cancel switching to the BWP if a negative acknowledgement is received from at least one mobile station of the group of mobile stations.

Aspect 10: The method of Aspect 8, wherein transmitting the sequence to the group of mobile stations includes transmitting the sequence to the group of mobile stations based at least in part on information that indicates that each of the mobile stations in the group of mobile stations has a capability to switch to the BWP.

Aspect 11: The method of any of Aspects 1-10, wherein selecting the sequence includes selecting the sequence based at least in part on a trigger from an application.

Aspect 12: The method of Aspect 11, wherein the BWP is mapped to the application.

Aspect 13: The method of Aspect 11 or 12, wherein the BWP is mapped to a quality of service for the application.

Aspect 14: A method of wireless communication performed by a second mobile station, comprising: receiving, by the second mobile station from a first mobile station, a sequence that is to be used by the second mobile station to wake up and switch to a bandwidth part (BWP) indicated by the sequence; and switching, by the second mobile station, to the BWP after waking up in connection with receiving the sequence.

Aspect 15: The method of Aspect 14, wherein the sequence indicates that the BWP is a first BWP and that the second mobile station is to wake up and switch to the first BWP after an offset.

Aspect 16: The method of Aspect 14 or 15, wherein the sequence indicates that the second mobile station is to wake up at a first resource, and wherein the waking up includes waking up at the first resource.

Aspect 17: The method of any of Aspects 14-16, wherein the sequence indicates that the second mobile station is to switch to the BWP for a time duration and return to a previous BWP after the time duration, and wherein the method includes switching to the previous BWP after the time duration.

Aspect 18: The method of Aspect 17, wherein the sequence indicates an offset from which the time duration starts, and wherein the method includes starting the time duration based at least in part on the offset.

Aspect 19: The method of any of Aspects 14-18, further comprising transmitting, by the second mobile station to the first mobile station, feedback for the sequence.

Aspect 20: The method of any of Aspects 14-19, further comprising: receiving a message to cancel the switching to the BWP; and canceling the switching to the BWP.

Aspect 21: The method of any of Aspects 14-20, wherein the BWP is mapped to an application.

Aspect 22: The method of any of Aspects 14-21, wherein the BWP is mapped to a quality of service for an application.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first mobile station for wireless communication, comprising:
  one or more memories; and
  one or more processors, based at least in part on information stored in the one or more memories, configured to:
    select an integrated sequence for sidelink communications between the first mobile station and a second mobile station,
    wherein the integrated sequence is a single message that:

wakes up the second mobile station based on the integrated sequence including a wake up signal (WUS), and
switches the second mobile station to a bandwidth part (BWP) based on the integrated sequence indicating the BWP;
generate the integrated sequence for the BWP and to include the WUS; and
transmit, to the second mobile station via a sidelink, the integrated sequence;
wherein the integrated sequence indicates that the second mobile station is to switch to the BWP for a time duration and return to a previous BWP after the time duration;
wherein the integrated sequence indicates an offset from which the time duration starts.

2. The first mobile station of claim 1, wherein the integrated sequence indicates that the BWP is a first BWP and that the second mobile station is to wake up and switch to the first BWP after an offset.

3. The first mobile station of claim 1, wherein the integrated sequence indicates that the second mobile station is to wake up at a first resource.

4. The first mobile station of claim 1, wherein the one or more processors are configured to switch to the BWP associated with the integrated sequence.

5. The first mobile station of claim 1, wherein the one or more processors, to select the integrated sequence, are configured to select the integrated sequence from within a set of group integrated sequences, and the one or more processors, to transmit the integrated sequence, are configured to transmit the integrated sequence to a group of mobile stations that includes the second mobile station.

6. The first mobile station of claim 5, wherein the one or more processors are configured to transmit, to the group of mobile stations, a message to cancel switching to the BWP if a negative acknowledgement is received from at least one mobile station of the group of mobile stations.

7. The first mobile station of claim 5, wherein the one or more processors, to transmit the integrated sequence to the group of mobile stations, are configured to transmit the integrated sequence to the group of mobile stations based at least in part on information that indicates that each of the mobile stations in the group of mobile stations has a capability to switch to the BWP.

8. The first mobile station of claim 1, wherein the one or more processors, to select the integrated sequence, are configured to select the integrated sequence based at least in part on a trigger from an application.

9. The first mobile station of claim 8, wherein the BWP is mapped to the application.

10. The first mobile station of claim 8, wherein the BWP is mapped to a quality of service for the application.

11. A second mobile station for wireless communication, comprising:
  one or more memories; and
  one or more processors, based at least in part on information stored in the one or more memories, configured to:
    receive, from a first mobile station via a sidelink, an integrated sequence for sidelink communications between the first mobile station and the second mobile station,
    wherein the integrated sequence is a single message that:

wakes up the second mobile station based on the integrated sequence including a wake up signal (WUS), and switches the second mobile station to a bandwidth part (BWP) based on the integrated sequence indicating the BWP, and wherein the integrated sequence is for the BWP and includes the WUS; and switch, after waking up and in connection with receiving the integrated sequence, to the BWP indicated by the integrated sequence;

wherein the integrated sequence indicates that the second mobile station is to switch to the BWP for a time duration and return to a previous BWP after the time duration, and wherein the one or more processors are configured to switch to the previous BWP after the time duration;

wherein the integrated sequence indicates an offset from which the time duration starts, and wherein the one or more processors are configured to start the time duration based at least in part on the offset.

12. The second mobile station of claim 11, wherein the integrated sequence indicates that the BWP is a first BWP and that the second mobile station is to wake up and switch to the first BWP after an offset.

13. The second mobile station of claim 11, wherein the integrated sequence indicates that the second mobile station is to wake up at a first resource, and wherein the one or more processors, to wake up, are configured to wake up at the first resource.

14. The second mobile station of claim 11, wherein the one or more processors are configured to transmit feedback for the integrated sequence to the first mobile station.

15. The second mobile station of claim 11, wherein the one or more processors are configured to:

receive a message to cancel the switching to the BWP; and cancel the switching to the BWP.

16. The second mobile station of claim 11, wherein the BWP is mapped to an application.

17. The second mobile station of claim 11, wherein the BWP is mapped to a quality of service for an application.

18. A first mobile station for wireless communication, comprising:

one or more memories; and one or more processors, based at least in part on information stored in the one or more memories, configured to:

select an integrated sequence for sidelink communications between the first mobile station and a second mobile station, wherein the integrated sequence is a single message that:

wakes up the second mobile station based on the integrated sequence including a wake up signal (WUS), and switches the second mobile station to a bandwidth part (BWP) based on the integrated sequence indicating the BWP;

generate the integrated sequence for the BWP and to include the WUS; and transmit, to the second mobile station via a sidelink, the integrated sequence;

wherein the one or more processors are configured to continue in a current BWP when feedback for the integrated sequence is not received within an offset period after transmitting the integrated sequence.

* * * * *